United States Patent
Druzhinina et al.

(10) Patent No.: US 6,311,679 B1
(45) Date of Patent: Nov. 6, 2001

(54) SYSTEM AND METHOD OF CONTROLLING AIR-CHARGE IN DIRECT INJECTION LEAN-BURN ENGINES

(75) Inventors: Maria Druzhinina, Goleta, CA (US); Ilya Vladimir Kolmanovsky, Ypsilanti, MI (US); Jing Sun, Bloomfield, MI (US); Michiel Jacques van Nieuwstadt, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/562,164

(22) Filed: May 2, 2000

(51) Int. Cl.⁷ .................... F02B 47/08; F02M 25/07
(52) U.S. Cl. ......................... 123/568.21; 123/399
(58) Field of Search ................. 123/568.21, 399

(56) References Cited

U.S. PATENT DOCUMENTS

| | | |
|---|---|---|
| 5,331,936 | 7/1994 | Messih et al. . |
| 5,349,936 | 9/1994 | Uchinami . |
| 5,474,051 | 12/1995 | Matsumoto et al. . |
| 5,513,616 | 5/1996 | Matsumoto et al. . |
| 5,635,633 | 6/1997 | Kadota . |
| 5,654,501 | 8/1997 | Grizzle et al. . |
| 5,738,126 | * 4/1998 | Fausten ........................ 123/399 |
| 5,950,595 | * 9/1999 | Yoshioka et al. ........... 123/568.21 |
| 5,964,200 | * 10/1999 | Shimada et al. ............. 123/399 |
| 6,016,788 | * 1/2000 | Kibe et al. ................... 123/399 |

* cited by examiner

*Primary Examiner*—Erick Solis
(74) *Attorney, Agent, or Firm*—Carlos Hanze

(57) ABSTRACT

A method and system for controlling the air charge in a direct injection spark ignition engine that provides proportional plus integral control in positioning an electronic throttle control valve and an exhaust gas recirculating valve in order to compensate for uncertainties in the EGR valve flow area. An adaptation algorithm is used to improve the estimate of in-cylinder flow and throttle open-loop control.

20 Claims, 5 Drawing Sheets

SYSTEM AND METHOD OF CONTROLLING AIR-CHARGE IN DIRECT INJECTION LEAN-BURN ENGINES

TECHNICAL FIELD

This invention relates to engine control systems and, more particularly, to a system and method of controlling air-charge in lean-burn, spark-ignited engines that compensates for uncertainties in the intake and exhaust system including EGR valve flow area and volumetric efficiency.

BACKGROUND ART

The objective of the air-charge control in lean-burn, spark-ignited engines is to operate the electronic throttle and the EGR valve in a manner so as to provide the desired gas flow to the engine and the desired burnt gas fraction in this flow for $NO_x$ reduction. The conventional approach to the air-charge control is open-loop whereby the desired mass flow rates through the EGR valve and throttle are calculated as functions of the desired burnt gas fraction in the intake manifold and of the desired gas flow into the cylinder. The desired values of the EGR valve position and of the throttle position are backtracked using an orifice equation with known effective flow area map. Suppose $F_{1,d}$ is the desired burn gas fraction, $W_{cyl,d}$ is the desired gas flow rate into the cylinder. The desired mass flow rate through the throttle and the desired mass flow rate through the EGR valve can be calculated as follows:

$$W_{th,d} = (W_{cyl,d} - W_{egr,d}),$$

$$W_{egr,d} = (F_{1,d}(W_{cyl,d} + W_f) W_{cyl,d} / W_f (1 + \lambda_s)),$$

where $\lambda_s$ is the stoichiometric air-to-fuel ratio and $W_f$ is the engine fueling rate. The desired throttle position, $u_{th}$, is determined from the intake manifold pressure $p_1$, ambient pressure, $p_{amb}$, and ambient temperature, $T_{amb}$, while the estimate of exhaust manifold temperature $T_2$ and exhaust manifold pressure $p_2$ as well as a measurement of $p_1$ are used to calculate the EGR valve position $u_{egr}$. Typically, the values of $F_{1,d}$, $W_{cyl,d}$ are functions of engine speed, engine torque, combustion mode, etc., determined by calibration tables that are optimized for fuel economy and emissions.

There are several problems with the conventional approach. First, the soot deposits in the EGR valve and pipes change the effective flow area of the valve. This problem is particularly severe with lean-burn, direct-injection, spark-ignition engines. Second, depending on the EGR valve and throttle type, calibration drifts may render their actual position uncertain. Due to these uncertainties, the desired mass flow rates may not be achieved with the open-loop approach; and the emission performance of the engine at a given engine speed and engine load point may be shifted away from the desired nominal performance. Even without the calibration drift, when the pressure drop across the throttle or the EGR valve is small, the open-loop procedure may lead to excessive chattering of the desired throttle position or EGR valve position due to noise in the pressure measurements. Other sources of uncertainty, such as changes in the engine back pressure due to the exhaust tract clogging, may also affect the engine operation in substantial ways.

More specifically, consider FIGS. 1–3. The dashed lines in these figures correspond to the steady-state values of the $NO_x$ mass flow rate, engine exhaust temperature and engine torque achieved by the conventional open-loop controller as a function of the unknown multiplier, $\theta_{egr}$, on EGR valve effective flow areas. The value of $\theta_{egr}=1$ correspond to the nominal case. Constant values of engine speed N=2000 rpm, fueling rate $W_f$=2 kg/hr, spark timing $\delta$=25 deg BTDC and constant desired values of the in-cylinder flow $W_{cyl,d}$=80 kg/hr and burnt gas fraction $F_{1,d}$=0.1 were used in the engine model simulation. With 40 percent of EGR valve flow area reduction, there is a significant increase in $NO_x$ emissions by 50 percent (see FIG. 1). FIGS. 2 and 3 demonstrate that the engine exhaust temperature and the engine brake torque are affected by changes in $\theta_{egr}$. The variations in $\theta_{egr}$ translate into variations in the burnt gas fraction delivered to the engine and, therefore, engine combustion variations.

DISCLOSURE OF INVENTION

In accordance with the present invention, a method is disclosed that produces robust engine operation in spite of these uncertainties. The method relies on adding feedback to the open-loop scheme to compensate for uncertainties in the EGR valve flow area and provides an adaptation algorithm to improve the estimate of in-cylinder flow and throttle open-loop control. The solid lines in FIGS. 1–3 that show much reduced, almost non-existent sensitivity of the engine emissions, exhaust temperature and engine torque to changes in $\theta_{egr}$ correspond to one of the embodiments that will be described hereinafter. Some of the embodiments use an estimate of the flow through the EGR valve that is derived from an intake manifold pressure measurement.

BEST MODE FOR CARRYING OUT THE INVENTION

Figure 1:
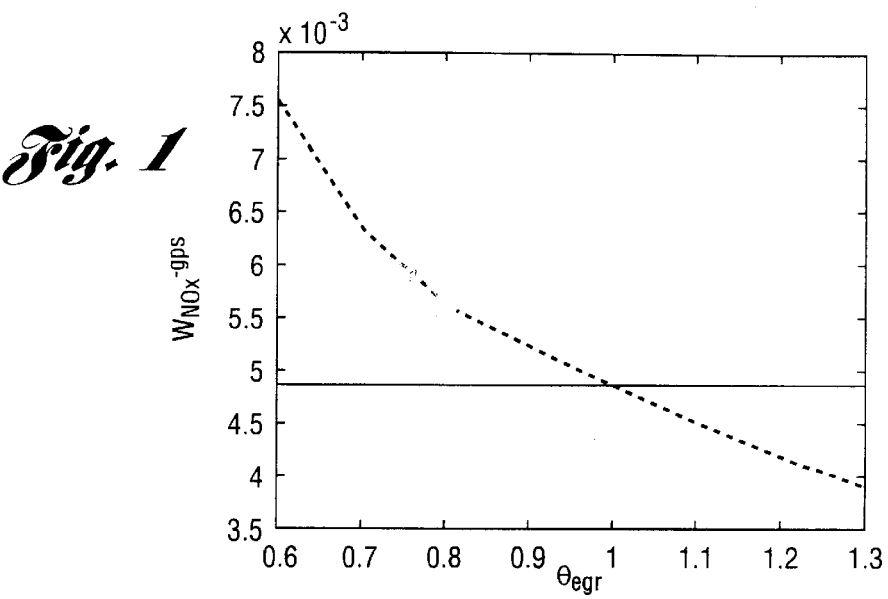
FIGS. 1–3 show comparisons between a prior art system configuration (dashed), and the system of the present invention (solid) with respect to feedgas $NO_x$ emissions sensitivity, feedgas temperature sensitivity, and engine torque sensitivity.

Referring again to the drawing and initially to FIG. 4, a block diagram of the control system of the present invention is shown. The system comprises an electronic engine controller generally designated 10, that includes ROM, RAM and CPU as indicated. The controller 10 controls a set of injectors 12, 14, 16 and 18 which inject fuel into a four-cylinder, spark ignited, lean-burn gasoline engine 20. The fuel is supplied by a high pressure fuel system (not shown), and is injected directly into the combustion chambers in precise quantities and timing as determined by the controller 10. Air enters the combustion chambers through the intake manifold 22, and combustion gases are exhausted through the exhaust manifold 24. An electronically controlled throttle valve 26 is positioned by the controller 10 to control the air mass flow into the intake manifold 22. An airmeter or air mass flow sensor 28 is positioned upstream of the valve 26 and provides a signal to the controller 10 that calculates a value indicative of the mass of air flowing into the induction system. The controller 10 transmits a fuel injector signal to the injectors to produce a desired engine torque and maintain a desired air/fuel ratio.

To reduce the level of $NO_x$ emissions, the engine is equipped with an exhaust gas recirculation (EGR) system 30. The EGR system 30 comprises a conduit 32 connecting the exhaust manifold 24 to the intake manifold 22. This allows a portion of the exhaust gases to be circulated from the exhaust manifold 24 to the intake manifold 22 in the direction of the arrow. An EGR valve 34, controlled by the controller 10, regulates the amount of exhaust gas recirculated from the exhaust manifold. In the combustion chambers, the recirculated exhaust gas acts as an inert gas, thus lowering the flame and in-cylinder gas temperature and decreasing the formation of $NO_x$. On the other hand, the recirculated exhaust gas displaces fresh air and reduces the air-to-fuel ratio of the in-cylinder mixture.

In the controller 10, command signals to the actuators for positioning the EGR valve 34 and the throttle valve 26 are calculated from measured variables and engine operating parameters by means of control algorithms. Sensors and calibratable lookup tables provide the controller 10 with engine operating information. For example, MAP sensor 36 provides a signal to the controller 10 indicative of the pressure in the intake manifold 24. A temperature sensor 38 provides a signal to the controller 10 indicative of the temperature of the gas in the intake manifold. The sensors 36 and 38 may be combined if desired. Additional sensory inputs can also be received by the controller 10 such as engine coolant temperature, engine speed, throttle position, and ambient temperature and barometric pressure. Based on the sensory inputs and engine mapping data stored in memory, the controller controls the EGR and throttle valves to regulate the intake airflow.

A heated exhaust gas oxygen (HEGO) sensor 40 or universal exhaust gas oxygen (UEGO) sensor detects the oxygen content of the exhaust gas generated by the engine, and transmits a signal to the controller 10. Sensor 40 is used for control of the engine A/F, especially during any stoichiometric operation. An exhaust system, comprising one or more exhaust pipes, transports exhaust gas produced from combustion of an air/fuel mixture in the engine to a conventional close-coupled, three-way catalytic converter (TWC) 42. The converter 42 contains a catalyst material that chemically alters exhaust gas that is produced by the engine to generate a catalyzed exhaust gas. The catalyzed exhaust gas is fed through an exhaust pipe 44 to a downstream $NO_x$ trap 46 and thence to the atmosphere through a tailpipe 48.

As is usually done, the control and adaptation algorithms discussed hereinafter are specified in continuous time. It is understood, however, that for the actual implementation the algorithms are discretized assuming either a time-synchronous or a crank-synchronous sampling procedure, with compensation of the delay introduced by sampling (if necessary). The signals used by the algorithms are filtered versions of the measured signals. The filters remove the periodic oscillations and noise in the signals so that the mean values of the signals are available for control and adaptation. First or second order linear filters or crank-synchronous sampling are standard ways of deriving the mean value from a signal. Hereinafter, all the signals are identified and referenced as their mean values. The controllers that use the integral action, such as proportional-plus-integral (PI) controllers, use antiwindup compensation. It is introduced to handle control signal saturation due to actuator limits.

Figure 4:
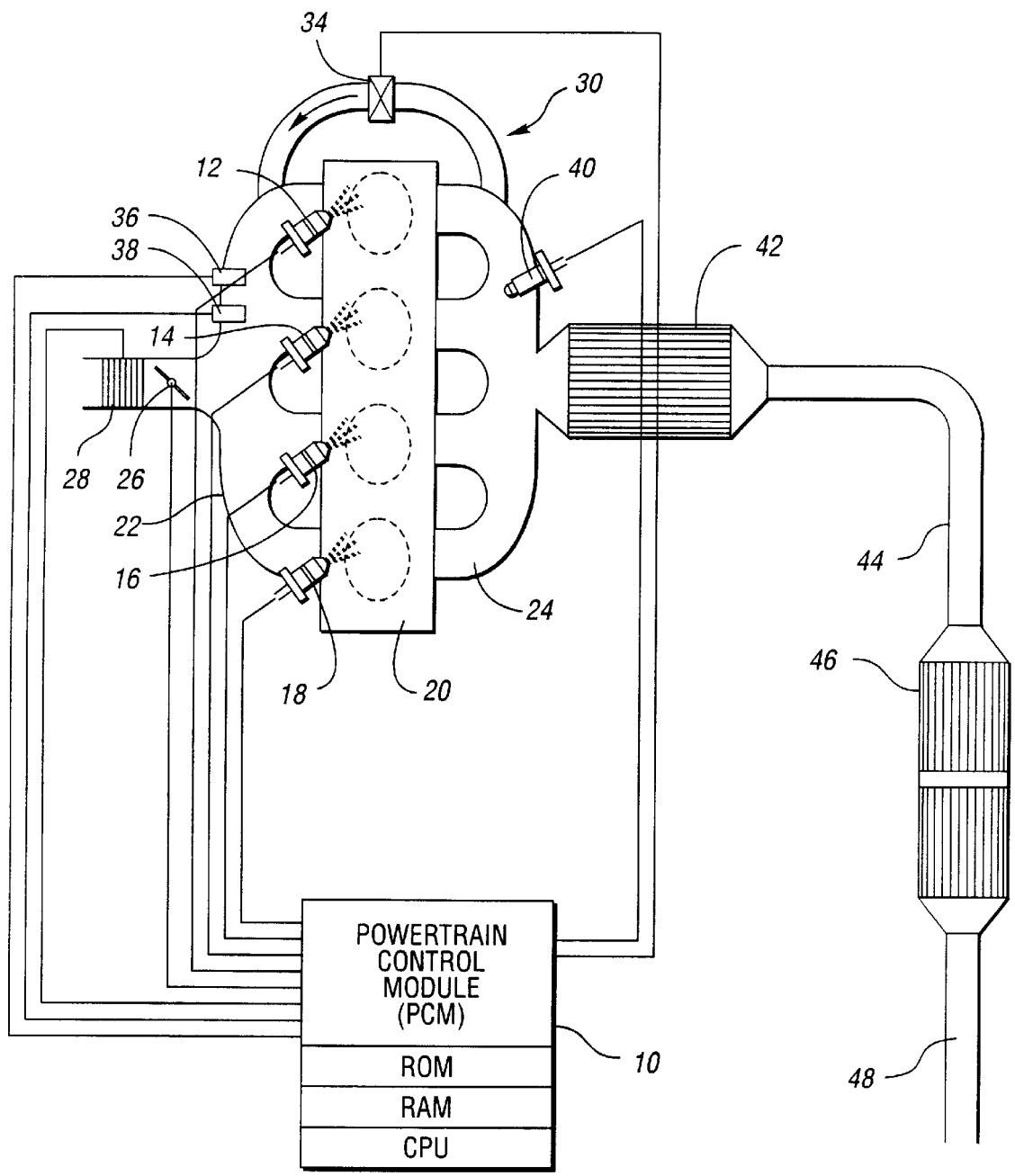
FIG. 4 shows a block diagram of the system of the present invention.

A relatively simple approach to reduce sensitivity to uncertainties in the EGR path (EGR valve flow area, exhaust pressure and temperature) is to add feedback on the deviation of the intake manifold pressure, $p_1$, from the desired pressure or set-point, $p_{1,d}$, $$u_{egr} = u_{egr,d} - k_p(p_{1,d} - p_1) - k_i \int_0^t (p_{1,d} - p_1(\sigma)) d\sigma,$$

$$u_{th} = u_{th,d},$$

where $u_{egr,d}$ is the desired EGR valve position (a function of engine speed and engine demanded torque) and $u_{th,d}$ is the desired throttle position (also function of engine speed and engine demanded torque). The controller adjusts the EGR valve position (due to the integral term) to correct for the uncertainty in the EGR valve flow area. The set point, $p_{1,d}$, can be derived from $W_{cyl,d}$ by inverting the "speed-density" equation (see Eq. 1 below) or can be specified directly as a function of engine speed, demanded engine torque, combustion mode and other variables.

Where a mass airflow sensor, such as MAF sensor 28 in FIG. 4, is available to measure the flow rate through the throttle, an improved design is possible. First, an estimate of the mass flow rate through the EGR valve is made using the measurements of the intake manifold pressure, $p_1$, mass flow rate through the throttle, $W_{th}$, and an estimate of the total in-cylinder flow $\hat{W}_{cyl}$. The total mass flow rate into the cylinder can be estimated from the speed-density equation and is a function of engine speed (N), intake manifold pressure ($p_1$) and estimated or measured intake manifold temperature ($T_1$), e.g., $$\hat{W}_{cyl} = k_0(N) \frac{p_1}{T_1} N, \tag{1}$$

where $k_0$ is a calibratable function. The estimator for the EGR flow rate is described by the following equations:

$$\dot{\varepsilon} = -\alpha_0 \varepsilon + \alpha_0(-\hat{W}_{cyl} + W_{th}) + \frac{\alpha_o^2}{c_m} p_1, \tag{2}$$

$$\hat{W}_{egr} = \frac{\alpha_0}{c_m} p_1 - \varepsilon, \tag{3}$$

where $\alpha_0 > 0$ is a calibratable parameter and $$c_m = \frac{RT_1}{V_1},$$

where $T_1$ is the intake manifold temperature and $V_1$ is the intake manifold volume. It should be noted that the estimate $\hat{W}_{egr}$ does not require knowledge of the exhaust pressure or exhaust temperature or of the EGR valve effective flow area. Furthermore, the precise knowledge of the value of $c_m$ is not needed for steady-state accuracy but is desirable in transients. Feedback is then imposed on the deviation of the estimate of the EGR flow rate, $\hat{W}_{egr}$, from the set point, $W_{egr,d}$.

Figure 2:
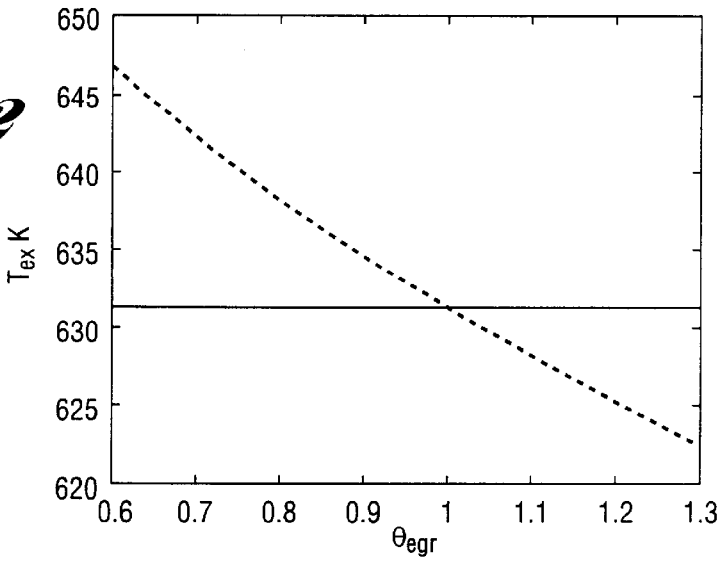
Figure 3:
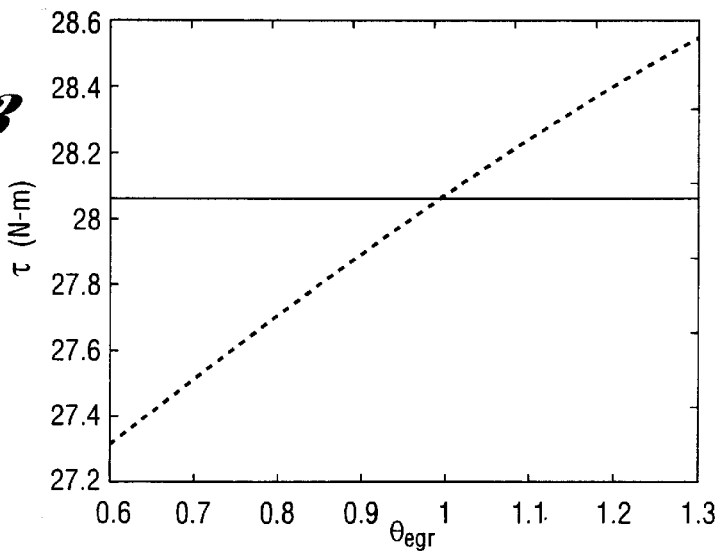

A decentralized proportional plus integral controller takes the form:

$$u_{th} = u_{th,d} - k_{p1}(p_{1,d} - p_1) - k_{i1} \int_0^t (p_{1,d} - p_1(\sigma)) d\sigma,$$

$$u_{egr} = u_{egr,d} - k_{p2}(W_{egr,d} - \hat{W}_{egr}) - k_{i2} \int_0^t (W_{egr,d} - \hat{W}_{egr}(\sigma)) d\sigma,$$

where $k_{p1}$, $k_{p2}$, $k_{i1}$, $k_{i2}$ are the controller gains. The responses shown in FIGS. 1–3 by solid lines and that indicate reduced sensitivity to EGR valve clogging are due to this controller. The above form for the controller is not the only one possible. A nonlinear proportional plus integral controller can be designed using the speed-gradient approach where an attempt is made to maximize the rate of decay of a cost, "energy-like" function:

$$Q = \frac{1}{2}(\gamma_1(p_1 - p_{1,d}))^2 + \frac{1}{2}(\gamma_2(\hat{W}_{egr} - W_{egr,d}))^2.$$

The objective is to make Q decay as rapidly as possible to zero, thereby resulting in $p_1$ tracking $p_{1,d}$ and $\hat{W}_{egr}$ tracking $W_{egr,d}$. Specifically, we can define $$\phi(p_{1,d}-p_1,p_1)=\gamma_1(p_1-p_{1,d})\tilde{W}_{th},$$

$$\Psi(p_{1,d}-p_1,p_1,W_{egr,d}-\hat{W}_{egr})=\gamma_1(p_1-p_{1,d})\tilde{W}_{egr}+\alpha_0\gamma_2\tilde{W}_{egr}[\hat{W}_{egr}-W_{egr,d}].$$

Here $\tilde{W}_{th}$ is a function of $p_1$, $\tilde{W}_{egr}$ is a function of $p_1, p_2$ and $T_2$ so that $$W_{th}=\tilde{W}_{th}u_{th}, \quad W_{egr}=\tilde{W}_{egr}u_{egr}\theta_{egr},$$

where $\theta_{egr}$ is the unknown parameter. Note that errors in estimating $\tilde{W}_{egr}$ can be tolerated by the proposed control design (similar to unknown $\theta_{egr}$ value). The controller takes the form, $$u_{th}=u_{th,d}-k_{p1}\phi-k_{i1}\int_0^t\phi d\sigma,$$

$$u_{egr}=u_{egr,d}-k_{p2}\Psi-k_{i2}\int_0^t\Psi d\sigma.$$

Figure 5:
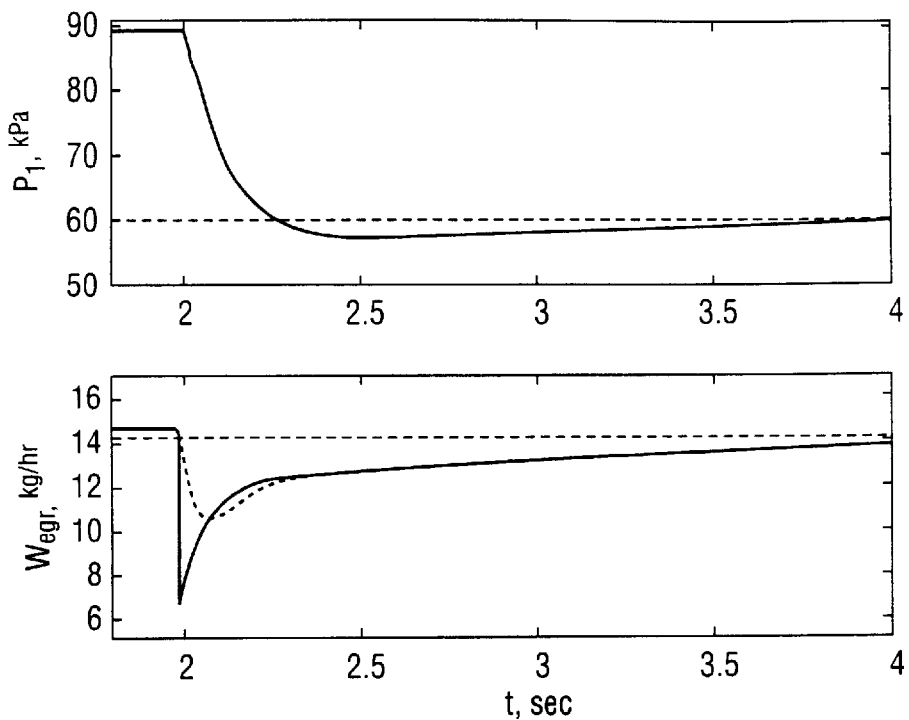
FIG. 5 shows time histories of the intake manifold pressure and EGR valve flow rate (solid lines)
Figure 6:
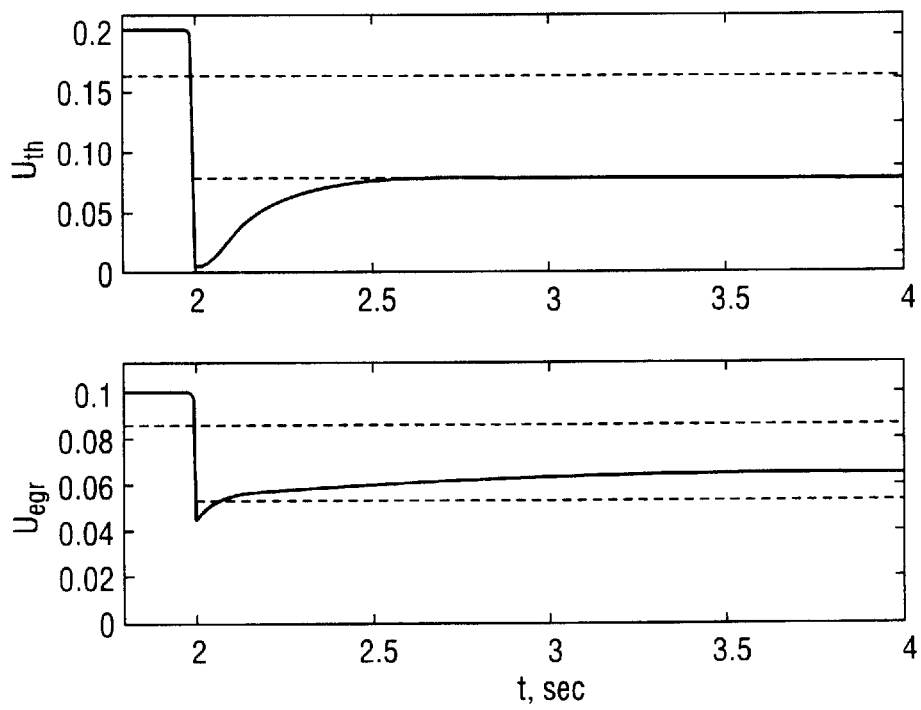
FIG. 6 shows time histories of throttle position and EGR valve position (solid lines)

FIGS. 5–6 illustrate the transient responses of this controller when the unknown restriction of the EGR valve flow area corresponds to $\theta_{egr}=0.8$. In FIG. 5, the estimate of EGR valve flow rate is shown by the dashed line, and the setpoints by the dash-dotted line. The controller is turned on at t=2 sec. In FIG. 6, the feedforward values of throttle position and EGR valve position (open loop commands) are shown by the dash-dotted lines. The actual EGR valve position differs from the open-loop feed-forward command in steady-state because of the compensatory action of the feedback controller. It should be noted that the estimator for $W_{egr}$ is able to keep up with only relatively slow variations in $\tilde{W}_{egr}$. While (in simulations) it is possible to Increase the estimator bandwidth by increasing the value of $\alpha_0$, a "slow" estimator is also acceptable since tracking of the set points is required only in steady state. In reality, the bandwidth of the estimator would always be limited by the sampling rate. The controller achieves the commanded values of the intake manifold pressure and of the EGR valve flow rate despite the uncertain EGR valve flow area.

The feedback controllers discussed above are sensitive to errors in estimating $W_{cyl}$. Reduction in in-cylinder flow rate can occur due to deposits as the engine ages. The effect of not estimating $W_{cyl}$ correctly on the operation of the controllers specified is that $W_{th}$ will still be regulated to $W_{th,d}$ (derived from $W_{cyl,d}$), but $W_{egr}$ will be regulated to $W_{egr,d}+(W_{cyl}-\hat{W}_{cyl})$ where $\hat{W}_{cyl}$ is an estimate of $W_{cyl}$ calculated on the basis of the "speed-density" equation. This will lead to errors in tracking $W_{egr,d}$ and $W_{cyl,d}$. An adaptive control algorithm is introduced to adjust the estimate of $W_{cyl}$ as the engine ages.

When the in-cylinder flow rate is uncertain, equation (2) and (3) cannot reliably estimate the EGR flow rate. The orifice equation cannot be used for EGR estimations either because the estimates of exhaust manifold pressure and temperature (that rely on the estimate of the in-cylinder flow rate) are also uncertain. Hence, to adapt the in-cylinder flow rate equation (1), EGR should be disabled by closing the EGR valve or waiting for engine operating conditions (such as acceleration) when the EGR valve is closed.

In this case, $$\dot{p}_1=c_m(W_{th}-W_{cyl}), \tag{4}$$

and it is assumed that $$W_{cyl}=\theta_{cyl}\tilde{W}_{cyl},$$

where $\theta_{cyl}$ is an unknown multiplier. The current estimate of $\theta_{cyl}$ is $\hat{\theta}_{cyl}$ so that an estimate of $W_{cyl}$ is given by:

$$\hat{W}_{cyl}=\hat{\theta}_{cyl}\tilde{W}_{cyl}.$$

An alternative estimate of $W_{cyl}$ is also obtained from the time rate of change of the intake manifold pressure, and $\hat{\theta}_{cyl}$ is adapted based on the difference of the two estimates. This can be done in a number of different ways and one algorithm will now be described. On-line parameter estimation can be done using a variety of the prediction-error-based methods, for example, the Least-Squares (LS) algorithm. Filtering both sides of the system equation through a first order filter one obtains $$Y(t)=\phi(t)\theta_{cyl},$$

where $$Y(t) = c_m\left(\frac{1}{s/\tau+1}W_{th}\right) - \frac{s}{s/\tau+1}p_1, \tag{5}$$

$$\phi(t) = \frac{c_m}{s/\tau+1}\tilde{W}_{cyl}. \tag{6}$$

Here the standard notation for the filter in terms of its transfer function is used and $\tau$ is the time constant of the first order filter. Then the LS estimator with forgetting factor looks as follows:

$$\dot{\hat{\theta}}_{cyl}=-P(t)\phi(t)(\phi(t)\hat{\theta}_{cyl}-Y(t)) \tag{7}$$

$$\frac{d}{dt}(P^{-1}) = -\lambda(t)P^{-1} + \phi^2(t),$$

where $$\lambda(t) = \lambda_0\left(1 - \frac{\|P\|}{k_0}\right), \lambda_0, k_0 > 0 \|P(0)\| \le k_0.$$

This estimator guarantees the exponential decay of the parameter error $\tilde{\theta}_{cyl}=\hat{\theta}_{cyl}-\theta_{cyl}$ due to the persistence of excitation conditions holding generically ($\tilde{W}_{cyl}\neq 0$).

A simpler scheme is the projection algorithm which in discrete time takes the form $$\hat{\theta}_{cyl}(t) = \hat{\theta}_{cyl}(t-1) + \frac{\gamma\phi(t)}{\alpha+\phi^2(t)}(Y(t) - \phi(t)\hat{\theta}_{cyl}(t-1)),$$

where $\alpha \ge 0$ and $0 < \gamma < 2$.

An alternative scheme which relies on the difference between the estimated and measured intake manifold pressure can also be used for the $W_{cyl}$ adaptation. Based on equation (4), one can generate the estimated intake manifold pressure based on the estimated in-cylinder flow as:

$$\hat{p}_1 = c_m(W_{th} - \hat{\theta}_{cyl}\tilde{W}_{cyl})$$

The difference between the measured intake pressure $p_1$ and the estimated $\hat{p}_1$ is due to error in the in cylinder flow estimation and can be used to adjust the parameter $\hat{\theta}_{cyl}$. A simple form of the projection algorithm in the discrete form is:

$$\hat{\theta}_{cyl}(t) = \hat{\theta}_{cyl}(t-1) + \frac{\gamma\phi(t)}{\alpha + \phi^2(t)}(p_1 - \hat{p}_1),$$

For the implementation of these adaptive algorithms disclosed here, a deadband is also applied to assure robustness of the adaptation scheme in the presence of other uncertainties such as measurement noise. For example, the adaptation to the in cylinder flow equation is only activated when the error between the measured and estimated intake manifold pressure $(p_1-\hat{p}_1)$ exceed some threshold. Below that threshold, this error could be caused just by measurement noise, therefore it is discarded and adaptation is stopped.

Figure 7:
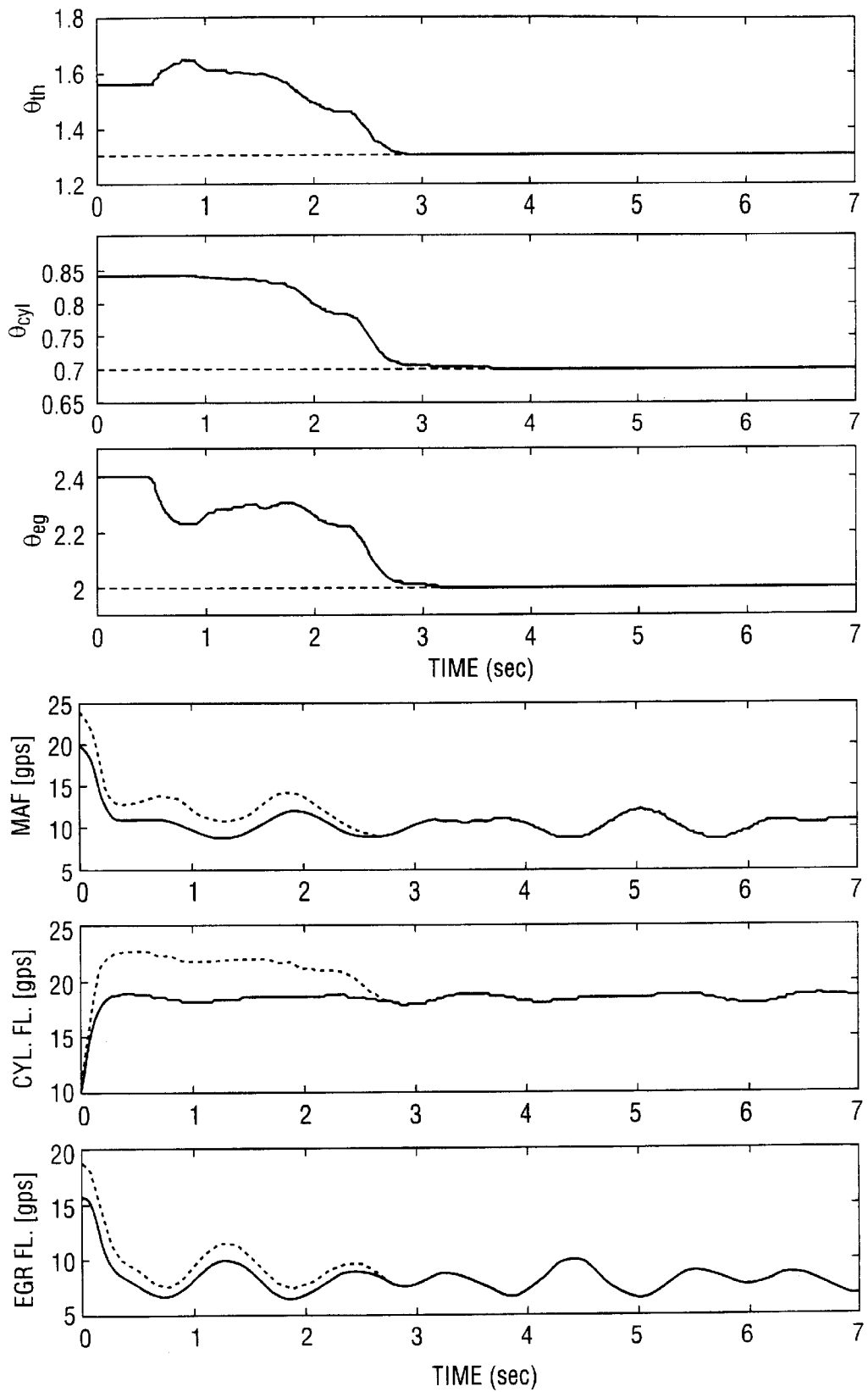
FIG. 7 shows some simulation results for the least squares adaptive algorithm.

FIG. 7 shows some simulation results for the LS adaptive algorithm. These simulation results are for the case when three parameters, the multiplier on the EGR valve flow, $\theta_{egr}$, the multiplier on the throttle flow rate, $\theta_{th}$, and the multiplier on the in-cylinder flow rate $\theta_{cyl}$ are unknown. In this case, periodic excitation is applied to the throttle and the EGR valve inputs (added to the nominal values) to assure parameter convergence. The simultaneous identification of three parameters requires the knowledge of the values of $\tilde{W}_{th}$, $\tilde{W}_{egr}$, and $\tilde{W}_{cyl}$, such that $W_{th}=\theta_{th}\tilde{W}_{th}$, $W_{egr}=\theta_{egr}\tilde{W}_{egr}$, $W_{cyl}=\theta_{cyl}\tilde{W}_{cyl}$. Since only the value of $\theta_{cyl}$ requires adaptation in the present invention, application of periodic excitation to the throttle and the EGR valve values can be avoided by closing the EGR valve during the adaptation.

A step-by-step procedure that avoids applying periodic excitation while identifying all three parameters is also possible. First, $\theta_{th}$ can be adapted using the measurements of the mass airflow. $\theta_{cyl}$ can then be adapted with the EGR valve closed. And finally, $\theta_{egr}$ can be adapted from the estimate of the EGR flow rate $W_{egr}$ provided by the estimator. Since the estimator provides an accurate representation for the EGR flow rate only when the variations in this flow rate are relatively slow, the knowledge of $\theta_{egr}$ can be used in an open loop estimate of the EGR flow rate, $W_{egr}=\theta_{egr}\tilde{W}_{egr}$, which is accurate even when changes in the flow rate are fast. The accurate estimate of the EGR flow rate is important for accurately estimating the burnt gas fraction in the intake manifold and, hence, setting the spark timing correctly.

Besides the deposits, another problem in estimating $W_{cyl}$ accurately is the estimation of the intake manifold temperature, $T_1$. Clearly, if $T_1$ is not measured, its estimate must take into account the information about both the EGR flow rate and the in-cylinder flow rate, both of which are being estimated. To avoid this "circular" estimate dependence, the use of an intake manifold temperature sensor 38, to measure $T_1$, is provided in FIG. 4. Typical temperature sensors are rather slow, and additional compensation is required. This compensation can be provided as follows. Suppose that the sensor dynamics are $$\dot{T}_{1,m} + \lambda T_{1,m} = \lambda T_1,$$

where $T_1$ is the intake manifold temperature and $T_{1,m}$ is its measurement where $1/\lambda$ is the time constant of the temperature sensor. By regressing engine variables, an estimate of $T_1, \tilde{T}_1$, for example, can be determined as $$\tilde{T}_1 = f(N, W_f, \hat{W}_t, \hat{W}_{egr}).$$

This estimate may not be, and does not have to be, very precise; and to improve it, a correction is added from the sensor measurement of the form, $$\hat{T}_1 = \tilde{T}_1 + \Delta\hat{T}_1,$$

where $$\Delta\hat{T}_1 = \frac{\alpha_0}{\lambda}T_{1,m} - \varepsilon,$$

$$\dot{\varepsilon} = -\alpha_0\varepsilon + \alpha_0(-T_{1,m} + \tilde{T}_1) + \frac{\alpha_0^2}{\lambda}T_{1,m}.$$

Here $\alpha_0$ is a calibratable constant.

Figure 8:
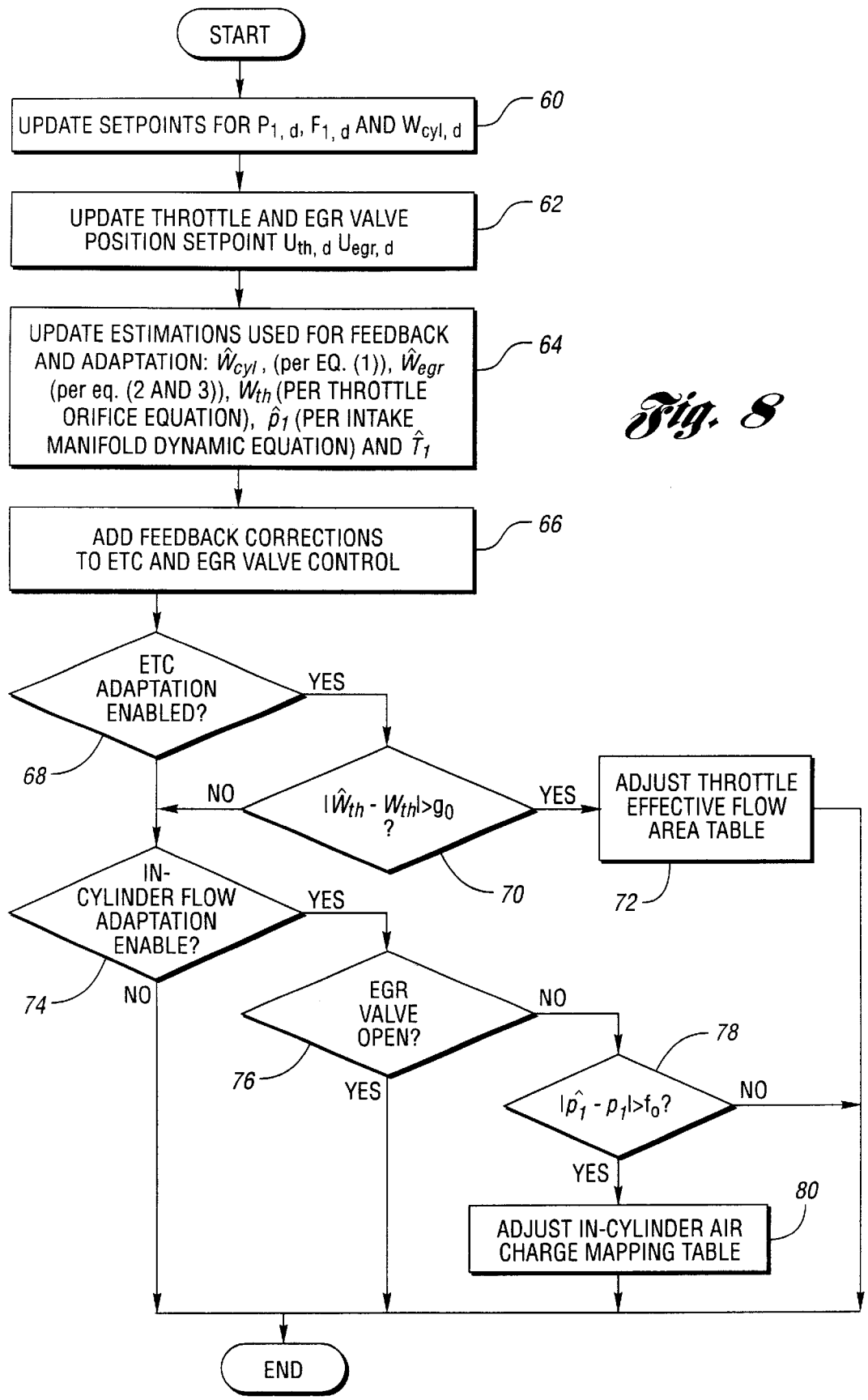
FIG. 8 shows a flowchart of the method of the present invention.

Referring now to FIG. 8, a flowchart for the method of the present invention is shown. In block 60, the desired values or set points for burnt gas fraction, intake manifold pressure, and mass flow rate to the cylinder are updated. In block 62, the set points for throttle and EGR valve positions are updated. In block 64, the estimated values of flow rate to the cylinder and through the EGR and ETC valves is determined as well as the estimated values of intake manifold pressure and temperature. In block 66, the feedback corrections to the throttle and EGR valve control are performed. If throttle adaptation is enabled, as determined at block 68, and the error between the estimated and measured throttle flow rate is greater than a threshold $g_0$, as determined in block 70, then the values in the throttle effective flow area lookup table are adjusted to reduce the estimation error as indicated in block 72. If throttle adaption is not enabled, or the throttle flow rate estimation error is less than the threshold $g_0$, a check is made at block 74 to determined if in-cylinder flow rate adaptation is enabled. If enabled, and the EGR valve is not open as determined in block 76, then if the estimated intake manifold pressure error is greater than a predetermined error threshold $f_0$ as determined in block 78, the in-cylinder air charge mapping table is adjusted as indicated in block 80.

While the best mode for carrying out the present invention has been described in detail, those familiar with the art to which this invention relates will recognize various alternative designs and embodiments for practicing the invention as defined by the following claims. For example, while the invention has been described in connection with a direct injection lean burn engine it is also applicable to the port fuel injection engine.

What is claimed is:

1. A method of controlling air charge in a direct-injection, spark-ignition engine having an exhaust gas recirculation (EGR) valve connecting the exhaust manifold and intake manifold of the engine, and an electronically controlled throttle (ETC) valve controlling air flow from the atmosphere to the intake manifold of said engine, comprising a sequence of the following steps:

generating an intake manifold pressure value which is indicative of measured intake manifold pressure;
   determining a desired intake manifold pressure value;
   determining a desired EGR valve position;
   determining a desired ETC valve position;
   adjusting said ETC valve position in accordance with said desired ETC valve position; and
   adjusting EGR valve position by an amount that is proportional to the error and the time integral of the error between said actual intake pressure value and said desired intake pressure value.

2. The method as set forth in claim 1 wherein said desired intake manifold pressure value is a function of engine speed, and demanded engine torque.

3. The method as set forth in claim 1 wherein said desired intake manifold pressure value is derived from the following equation:

$$p_{1,d} = W_{cyl,d} * T_1 / (k_0(N) * N)$$

where;

$\hat{W}_{cyl,d}$ is desired total mass flow rate into the cylinder,

N is engine speed, $T_1$ is intake manifold temperature, and $k_0$ is a calibratable function.

4. The method as set forth in claim 1 wherein the EGR and ETC valve positions are determined in accordance with the following equations:

$$u_{egr}(k) = u_{egr,d}(k) - k_p(p_{1,d}(k) - p_1(k)) - k_i Z(k)$$

$$Z(k+1) = Z(k) + (p_{1,d}(k) - p_1(k)) * \Delta T$$

$$u_{th} = u_{th,d}$$

where;

$\Delta T$ is the sampling time interval, $u_{egr,d}$ is the desired EGR valve position, $u_{th,d}$ is the desired ETC valve position, $p_{1,d}$, is the desired intake manifold pressure, and $k_p$ and $k_i$ are proportional and integral gains respectively.

5. A method of controlling air charge in a direct-injection, spark-ignition engine having an exhaust gas recirculation (EGR) valve connecting the exhaust manifold and intake manifold of the engine, and an electronically controlled throttle (ETC) valve controlling air flow from the atmosphere to the intake manifold of said engine, comprising a sequence of the following steps:

generating a pressure value which is indicative of actual intake manifold pressure;

generating a mass air flow value which is indicative of the actual mass air flow through said ECT valve;

generating a temperature value which is indicative of actual intake manifold temperature;

estimating the total mass flow rate into a cylinder;

estimating the mass flow rate through said EGR valve as a function of said pressure value, mass air flow through said ECT valve, and estimated total mass flow rate into said cylinder; and adjusting said EGR valve position by an amount that is proportional to the error and the time integral of the error between said desired flow rate through said EGR valve and the estimated mass flow rate through said EGR valve.

6. The method as set forth in claim 5 including the additional step of adjusting said ETC valve position by an amount that is proportional to the error and the time integral of the error between said desired and actual intake manifold pressure.

7. The method set forth in claim 6 wherein the step of adjusting said EGR valve is governed by the following equation:

$$u_{egr}(k) = u_{egr,d}(k) - k_{p2}(W_{egr,d}(k) - \hat{W}_{egr}(k)) - k_{i2} Z_2(k)$$

$$Z_2(k+1) = Z_2(k) + (W_{egr,d}(k) - \hat{W}_{egr}(k)) \Delta T$$

where:

$\Delta T$ is the sampling time interval, $u_{egr,d}$ is the desired EGR valve position, and $k_{p2}$ and $k_{i2}$ are proportional and integral gains respectively, $$W_{egr,d} = (F_{1,d}(i\ W_{cyl,d} + W_f) W_{cyl,d} / W_f (1 + \lambda_s)),$$

where $\lambda_s$ is the stoichiometric air-to-fuel ratio, $W_f$ is the engine fueling rate, $F_{1,d}$ is the desired burn gas fraction, and $W_{cyl,d}$ is the desired gas flow rate into the cylinder $$\hat{W}_{egr} = \frac{\alpha_0}{c_m} p_1 - \varepsilon,$$

where:

$p_1$ is the actual measured intake manifold pressure, and $\varepsilon$ is given by the following equation:

$$\varepsilon(k+1) = (1 - \alpha_0 \Delta T)\varepsilon(k) + \left(\alpha_0(-\hat{W}_{cyl} + W_{th}) + \frac{\alpha_0^2}{C_m} p_1\right)\Delta T,$$

$\alpha_0 > 0$ is a calibratable parameter and $$c_m = \frac{RT_1}{V_1}$$

where $T_1$ is the intake manifold temperature and $V_1$ is the volume of the intake manifold, $$\hat{W}_{cyl} = k_0(N) \frac{p_1}{T_1} N,$$

where $k_0$ is a calibratable function, and

N is engine speed.

8. The method as set forth in claim 7 wherein the step of adjusting said ETC valve position is governed by the following equation:

$$u_{th}(k) = u_{th,d}(k) - k_{p1}(p_{1,d}(k) - p_1(k)) - k_{i1} Z_1(k)$$

$$Z_1(k+1) = Z_1(k) + (p_{1,d}(k) - p_1(k)) * \Delta T$$

where: $\Delta T$ is the sampling time interval, $p_{1,d}$ is the desired intake manifold pressure, $p_1$ is actual intake manifold pressure, and $k_{p1}$ and $k_{i1}$ are proportional and integral gains respectively.

9. The method as set forth in claim 8 including the additional step of adjusting the estimated total mass flow into a cylinder and the estimated total flow through the throttle to compensate for component variation and uncertainty.

10. The method as set forth in claim 9 wherein the adjusting step is performed when the EGR valve is closed.

11. The method as set forth in claim 10 wherein the total mass flow into the cylinder is estimated from the time rate of change of the intake manifold pressure and the estimated mass flow is adjusted using a prediction error based algorithm.

12. A system for controlling the air charge in a direct injection spark ignition engine comprising:

an exhaust gas recirculating (EGR) valve connecting an intake manifold and an exhaust manifold of the engine;

an electronically controlled throttle (ETC) valve controlling air flow from the atmosphere to the intake manifold of said engine;

a manifold absolute pressure (MAP) sensor for sensing the actual intake manifold pressure;

a mass air flow (MAF) sensor for sensing actual mass air flow through said ECT valve;

a temperature sensor for sensing intake manifold temperature;

a proportional plus integral controller for positioning said ETC valve as a function of a desired ETC valve position, the pressure difference between an actual and desired intake manifold pressure, and the integral of said pressure difference and for positioning said EGR valve as a function of a desired EGR valve position, the flow rate difference between an estimated EGR flow rate and a desired EGR flow rate, and the integral of said flow rate difference.

13. The system of claim 12 wherein the mass flow rate through said EGR valve is a function of said intake manifold pressure, mass air flow through said ECT valve, and estimated total mass flow rate into a cylinder of said engine.

14. The system of claim 12 wherein said controller is programmed to control the position of said ETC valve and said EGR valve in accordance with the following equations:

$$u_{th}(k) = u_{th,d}(k) - k_{p1}(p_{1,d}(k) - p_1(k)) - k_{i1}Z_1(k)$$

$$Z_1(k+1) = Z_1(k) + (p_{1,d}(k) - p_1(k)) * \Delta T$$

$$u_{egr}(k) = u_{egr,d}(k) - k_{p2}(W_{egr,d}(k) - \hat{W}_{egr}(k)) - k_{i2}Z_2(k)$$

$$Z_2(k+1) = Z_2(k) + (W_{egr,d}(k) - \hat{W}_{egr}(k))\Delta T$$

where:

$\Delta T$ is the sampling time interval, $u_{egr,d}$ is the desired EGR valve position, and $k_{p2}$ and $k_{i2}$ are proportional and integral gains respectively, $$W_{egr,d} = (F_{1,d}(W_{cyl,d} + W_f)W_{cyl,d}/W_f/(1+\lambda_s)),$$

where $\lambda_s$ is the stoichiometric air-to-fuel ratio, $W_f$ is the engine fueling rate, $F_{1,d}$ is the desired burn gas fraction, and $W_{cyl,d}$ is the desired gas flow rate into the cylinder $$\hat{W}_{egr} = \frac{\alpha_0}{c_m} p_1 - \varepsilon,$$

where:

$p_1$ is the actual measured intake manifold pressure, and $\varepsilon$ is given by the following equation:

$$\varepsilon(k+1) = (1 - \alpha_0 \Delta T)\varepsilon(k) + \left(\alpha_0(-\hat{W}_{cyl} + W_{th}) + \frac{\alpha_0^2}{C_m} p_1\right)\Delta T,$$

$\alpha_0 > 0$ is a calibratable parameter and $$c_m = \frac{RT_1}{V_1}$$

where $T_1$ is the intake manifold temperature and $V_1$ is the volume of the intake manifold, $$\hat{W}_{cyl} = k_0(N)\frac{p_1}{T_1}N,$$

where $k_0$ is a calibratable function, and N is engine speed.

15. The system of claim 14 wherein said controller adjusts the estimate of mass flow rate into a cylinder and the estimate of the intake manifold temperature.

16. A system for controlling the air charge in a direct injection spark ignition engine comprising:

an exhaust gas recirculating (EGR) valve connecting the intake manifold and exhaust manifold of the engine;

an electronically controlled throttle (ETC) valve controlling air flow from the atmosphere to the intake manifold of said engine;

a manifold absolute pressure (MAP) sensor for sensing the actual intake manifold pressure;

a mass air flow (MAF) sensor for sensing actual mass air flow through said ECT valve;

a temperature sensor for sensing intake manifold temperature;

a nonlinear proportional plus integral controller responsive to the outputs of said sensors for positioning said ETC valve and said EGR valve in accordance with the following equations:

$$u_{th} = u_{th,d} - k_{p1}\phi - k_{i1}\int_0^t \phi d\sigma,$$

$$u_{egr} = u_{egr,d} - k_{p2}\Psi - k_{i2}\int_0^t \Psi d\sigma.$$

17. The system of claim 16 wherein the total mass flow into the cylinder is adapted using the time rate of change of the intake manifold pressure and a prediction error based algorithm.

18. The system of claim 15 wherein said controller adjusts the estimate of mass flow rate into a cylinder.

19. The system of claim 18 wherein the total mass flow into the cylinder is adapted using the time rate of change of the intake manifold pressure and a prediction error based algorithm.

20. The system of claim 18 wherein the total mass flow into the cylinder is adapted on the basis of the difference between the estimated pressure and the measured pressure.

* * * * *